No. 723,045. PATENTED MAR. 17, 1903.
C. C. SHAFFER.
ARTIFICIAL BAIT.
APPLICATION FILED NOV. 8, 1902.
NO MODEL.

Witnesses
Geo. Ackman.
Chas. S. Hoyer.

Inventor
Charles C. Shaffer,
By Victor J. Evans
Attorney

UNITED STATES PATENT OFFICE.

CHARLES C. SHAFFER, OF ALLIANCE, OHIO.

ARTIFICIAL BAIT.

SPECIFICATION forming part of Letters Patent No. 723,045, dated March 17, 1903.

Application filed November 8, 1902. Serial No. 130,610. (No model.)

*To all whom it may concern:*

Be it known that I, CHARLES C. SHAFFER, a citizen of the United States, residing at Alliance, in the county of Stark and State of Ohio, have invented new and useful Improvements in Artificial Bait, of which the following is a specification.

This invention relates to artificial fishing-bait particularly adapted for use in trolling; and the purpose of the same is to provide simple and effective means, in connection with a body simulating a fish or live bait, whereby additional commotion in the water and an advantageous reflection on the different colorings of the body add to its attractiveness and lessen resistance and strain on the rod and line.

A further purpose is to fasten the hooks to the body of the bait in such manner as to prevent the same from becoming readily detached and at the same time allow the freest possible action of the hooks, thereby lessening the liability of breaking by fish when striking or after being hooked.

A further purpose of the improvement is to provide means in the form of small air-chambers above the center of a weighted lower portion of the body of the bait to preclude the possibility of the latter turning and avoid any tendency to twist the line and the necessity for the use of swivels or the like.

With these and other objects and advantages in view the invention consists in the construction and arrangement of the several parts, which will be more fully hereinafter described and claimed.

Figure 1:
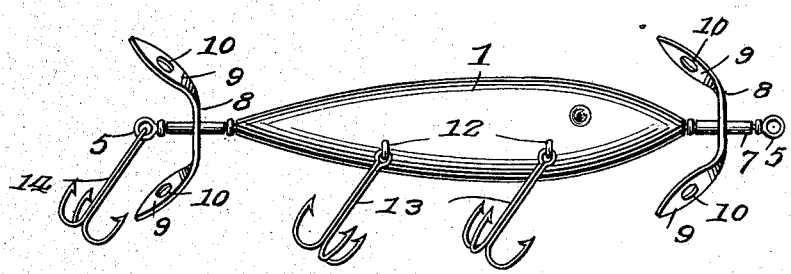
Figure 2:
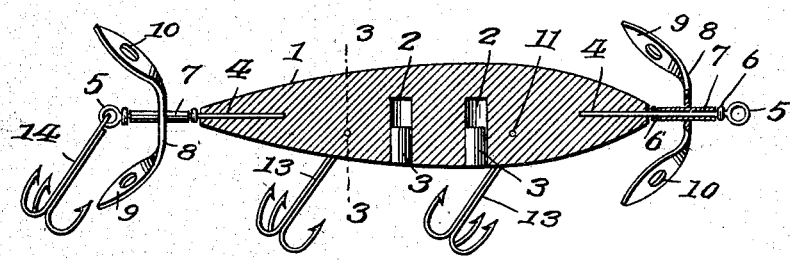
Figure 3:
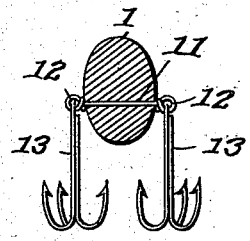

In the drawings, Figure 1 is a side elevation of a bait embodying the features of the invention. Fig. 2 is a longitudinal vertical section thereof. Fig. 3 is a transverse vertical section on the line 3 3, Fig. 2.

Similar numerals of reference are employed to indicate corresponding parts in the several views.

The numeral 1 designates a body of suitable light material simulating the form of a fish, and which will be prepared by the application thereto of suitable coloring-matter to represent live bait of different kinds. The body at about a central point has small chambers 2 constructed therein and opening out at the bottom, and in the lower portions of said chambers are weights 3. The chambers 2 increase the buoyancy of the body of the bait, and the weights 3 maintain the same in equilibrium and overcome tendency to rolling movements. Projecting longitudinally from opposite ends of the body are wire rods 4 of suitable stiffness, having eyes 5 formed at their outer ends. Between limiting-stops 6 on the rods 4 sleeves 7 are rotatably mounted, one on each rod, and projecting from said sleeve are blades 8, having broadened extremities 9, with apertures or openings 10 therethrough. The blades are given a slight torsional twist or deflection, and, together with the sleeves 7, form spinners at the opposite ends of the body. The blades also have their extremities bent at an angle of inclination in a rearward direction, so as to reduce the obstruction of the bait as an entirety through the water. Passing transversely through the body 1 in front and in rear of the transverse center thereof are wire rods 11, having terminal eyes 12, formed thereon close to the opposite sides of the body to removably receive hook-gangs 13. Secured to the eye 5 of the rear rod 4 is a hook-gang 14, the eye of the front rod being clear for engagement thereto of the line.

The advantage derived from the form of spinners set forth is that they set up a material commotion in the water which passes through the apertures or openings 10 of the blades 8 and also set up a reflection of light through the said openings or apertures on the different colorings of the bait-body, and thereby add to its attractiveness and at the same time lessen the resistance to movement of the bait and reduce the strain on the rod and line to a minimum. By means of the rods 11, passing completely through the body 1, the hook-gangs 13 are secured in a positive manner and resist any tendency toward loosening or pulling out and also increase the strength of the said hook-gangs and prevent fish when striking or after being hooked from breaking the same.

It will be understood that different forms of hooks may be attached to the rods 11 and to the eye 5 of the rear rod 4, and when a fish strikes the bait while it is being propelled through the water it is almost certain that it will be caught, in view of the position of the hooks on opposite sides of the body and at the rear of the same.

Changes in the proportions, dimensions, and minor details may be resorted to without in the least departing from the spirit of the invention.

Having thus fully described the invention, what is claimed as new is—

1. An artificial bait, having spinners at opposite ends comprising blades with broadened ends formed with openings therethrough.

2. An artificial bait, comprising a body having spinners at opposite ends including blades with broadened extremities arranged at a rear angle of inclination and having openings therethrough.

3. An artificial bait, comprising a body having air-chambers therein opening out through the bottom thereof, and weights inserted in such chambers and located at the lower portion of the said body.

4. An artificial bait, having spinners at opposite ends with openings therethrough.

5. An artificial bait, comprising a solid body having air-chambers extending upwardly thereinto at the center from the lower portion.

6. An artificial bait, comprising a solid body having air-chambers extending upwardly thereinto from the lower portion in advance and in rear of the center thereof, rods extending transversely through the body at points in advance and in rear of the air-chambers, and hooks secured to the opposite terminals of the said rods and located on opposite sides of the body.

7. An artificial bait, comprising a solid body with air-chambers vertically extending upwardly thereinto from the lower portion thereof.

In testimony whereof I affix my signature in presence of two witnesses.

CHAS. C. SHAFFER.

Witnesses:
   E. H. SEVERANCE,
   B. B. SHAFFER.